United States Patent
Peter et al.

(10) Patent No.: US 7,025,882 B2
(45) Date of Patent: Apr. 11, 2006

(54) WASTE DISPOSAL PLANT FOR WET GARBAGE, ESPECIALLY FOR REFUSE FROM LARGE-SCALE KITCHENS

(75) Inventors: Klem Peter, Kehl-Marlen (DE); Joachim Otschik, Aschoffenburg (DE); Björn Fassen, Nordagutu (NO)

(73) Assignee: Meiko Maschinenbau GmbH & Co KG (DE)

( * ) Notice: Subject to any disclaimer, the term of this patent is extended or adjusted under 35 U.S.C. 154(b) by 267 days.

(21) Appl. No.: 10/257,089

(22) PCT Filed: Apr. 23, 2002

(86) PCT No.: PCT/EP02/04463

§ 371 (c)(1),
(2), (4) Date: Mar. 20, 2003

(87) PCT Pub. No.: WO02/085759

PCT Pub. Date: Oct. 31, 2002

(65) Prior Publication Data

US 2003/0201220 A1 Oct. 30, 2003

(30) Foreign Application Priority Data

Apr. 23, 2001 (DE) ................................. 201 06 954 U

(51) Int. Cl.
*B65G 53/60* (2006.01)
*B05F 1/10* (2006.01)

(52) U.S. Cl. .............. 210/416.1; 210/497.01; 210/497.3

(58) Field of Classification Search ........... 210/416.1, 210/435, 497.01, 497.3, 407, 411
See application file for complete search history.

(56) References Cited

U.S. PATENT DOCUMENTS 3,317,047 A * 5/1967 Hansen .................. 210/139
5,897,775 A   4/1999 Kihlstrom

FOREIGN PATENT DOCUMENTS

| DE | 29917059 U | 1/2001 |
| DE | 20106954 U | 10/2001 |
| EP | 204879 | 12/1999 |

* cited by examiner

*Primary Examiner*—Fred G. Prince
(74) *Attorney, Agent, or Firm*—Shlesinger & Fitzsimmons

(57) ABSTRACT

This invention refers to a waste disposal plant for wet garbage, especially for refuse from large-scale kitchens. The wet garbage is transported by compressed air or a partial vacuum from decentralized input stations (30) to a central discharge device (12). A sieve-like collecting funnel (14) is provided there, from which liquid exits to an external collection area (19) and is drained off at intervals. The remaining wet garbage has thus already been largely drained when is passed on for further processing, for instance to a grinder (80) and a water extraction press (90), before being fed for instance to a food refuse silo (94).

14 Claims, 6 Drawing Sheets

WASTE DISPOSAL PLANT FOR WET GARBAGE, ESPECIALLY FOR REFUSE FROM LARGE-SCALE KITCHENS

This invention refers to a waste disposal plant for wet garbage according to the preamble of claim 1.

Waste disposal plants of this kind are used in all types of large-scale kitchens such as company canteens.

A waste disposal plant according to the preamble of claim 1 is described for the most part in the German utility model 299 17 059.

The object of the invention is to design a waste disposal plant according to the preamble of claim 1 in such a manner that the proportion of liquid in the solid portion of the wet garbage to be further processed is substantially reduced.

In particular, water extraction devices are to be provided directly within a central discharge device and immediately following the central collection of the wet garbage from decentralized input stations, before or without the wet garbage having been ground and/or drained in downstream wet presses such as wet worms.

The object is carried out in accordance with the invention by the features of claim 1. Further embodiments of the invention are protected in the subclaims.

In the subject matter of the invention a sieve-like, downwardly conically tapering vertical collecting funnel is provided in the housing of the discharge device. Air flows into the discharge device at a tangent. This causes the air to rotate together with the wet garbage in the sieve. The drained solid waste falls downwardly. A major portion of the liquid is directly removed in an exterior collection area adjoining the collecting funnel and sieve. This is done either with compressed air supplied to the filter from above, or by a partial vacuum produced externally through an evacuation conduit or an evacuation pump, or simply by draining the liquid through gravity.

The wet garbage is transported in batches from the input stations to the central discharge device. The collected liquid is likewise suctioned off intermittently in batches from the exterior area, which preferably has a bottom collecting pan, through a liquid drainage line and a valve-controlled intermediate chamber, and is then conveyed into the sewage system or the like. The previously drained waste is removed—likewise in individual batches and manually or cyclically controlled—through the open floor of the collecting funnel and down into a sluice formed by two slide valves, and is passed from there to a collection device, generally via a grinder and/or an additional water extraction press such as a water extraction worm.

The collecting funnel can preferably be easily changed through a sealed laterally removable exterior wall, then precisely adjusted and held in place with easily releasable clamps. Filters, sieves or disk filters or the like can be arranged in the collecting funnel to enable fine adjustment to the particular wet garbage. Both the collecting funnel and the entire chamber of the discharge device can be cleaned easily-even automatically, for example-with cleansing nozzles disposed at the top.

For practical purposes the input stations are likewise funnel shaped. They preferably have a horizontal or flatter exterior annular sieve, with an angular area of approximately 15 to 25° extending inwardly and downwardly from the horizontal, followed on the inside by an adjoining steeper input funnel with an angle from the horizontal of approximately 40 to 65°, preferably 50 to 60°. In a preferred embodiment the input funnel comprises a flatter upper funnel section with an angle of approximately 40 to 50° from the horizontal, and an adjoining lower funnel section with an angle of approximately 70 to 80° from the horizontal. Selection of this angle permits a wet flushing device to be omitted, since the wet garbage such as that occurring in large-scale kitchens automatically falls into the adjoining central transport pipe on its own. This pipe is opened at intervals under partial vacuum and the accumulated wet garbage is transported to the central discharge device. A compressed air plant could also be used instead of a vacuum system and partial vacuum. Such a compressed air plant basically works in the same manner, with the wet garbage being forced from the individual input stations into the upper region of the collecting funnel of the discharge device.

The outer upper annular sieve lies in a peripheral groove so as to be easily removable. The groove communicates through a connecting line with a drain pipe.

Embodiments of the invention are represented in the drawings.

The same parts in the drawings bear the same reference numbers. The waste disposal plant for wet garbage in FIG. 1 is generally designated as 10, the discharge device is generally designated as 12, and the collecting funnel is generally referred to as 14.

Figure 1:
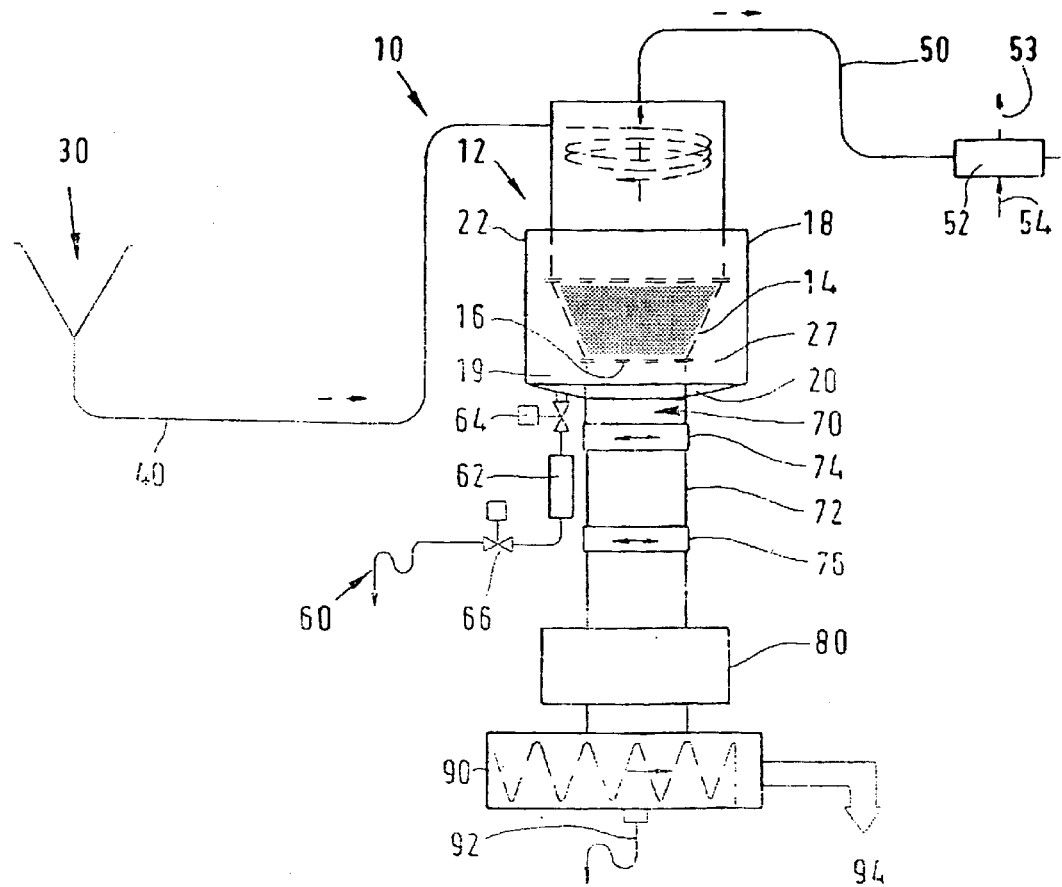
FIG. 1 shows an overall view of a waste disposal plant for wet garbage.

The liquid drainage is generally labeled with 60, the discharge device for the drained solid parts with 70, the downstream grinder with 80, and the following water extraction press with 90.

The input station is generally designated as 30, the transport pipe from the input station 30 to the discharge device 12 as 40, the evacuation conduit between the discharge device 12 and an evacuation pump 52 is labeled with 50, and the return line of the conveying air to the exhaust line 53 is referred to as 54.

The housing of the discharge device 12 is labeled 18, its external area for the collection of liquid bears the number 19, the easily removable side wall is number 22, the open bottom of the collecting funnel 14 is labeled 16, and the lower liquid collecting pan disposed on the bottom of the housing 18 bears the number 20.

The liquid drainage generally designated as 60 leads away from the collecting pan 20. It permits intermittent liquid discharge into the sewage system, etc. via an upper control valve 64 and a lower control valve 66 and via a sluice chamber 62 in between.

Following the controllable cyclical water extraction from the wet garbage entering the collecting funnel 14 from above, the wet garbage is cyclically passed on to a food refuse silo through a discharge pipe 70 connected at the bottom, namely via the bottom orifice 16 of the collecting funnel 14, an upper controllable slide valve 74 and a lower controllable slide valve 76 forming a sluice chamber 72.

Subsequently to this, the largely drained wet garbage can be fed to a grinder 80 and from there to a conventional water extraction press, provided here as a worm press 90. The waste, dried once more, then passes through a pipe 94 into a food refuse silo, where it is further processed and/or discharged. An additional drainage line 92 leads, for example, to the sewer.

Figure 2:
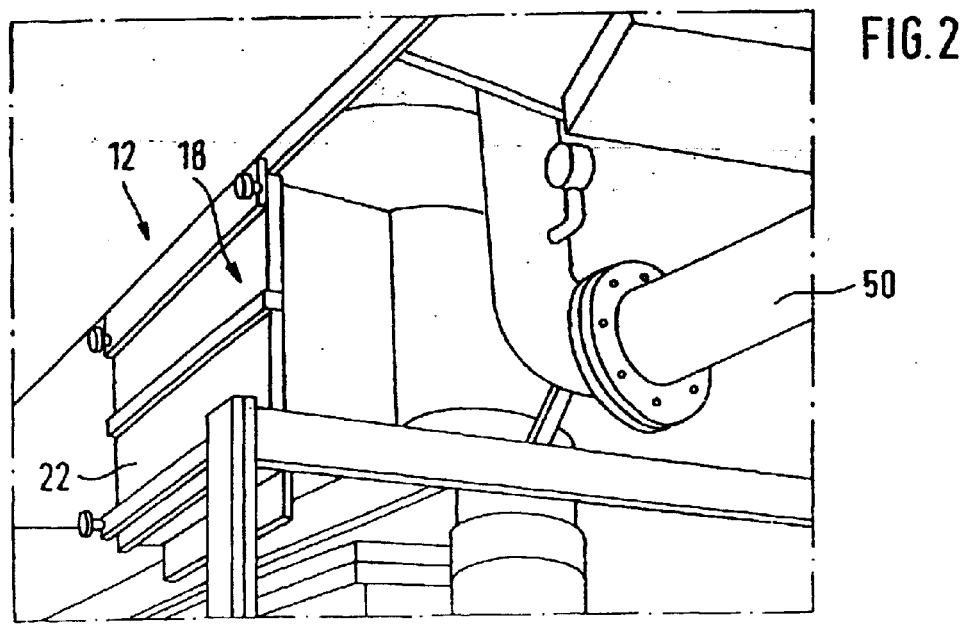
FIG. 2 shows a perspective view of a closed discharge device.

FIG. 2 essentially shows the closed housing 18 of the discharge device 12, including the removable cover 22, and in addition the evacuation conduit 50.

Figure 3:
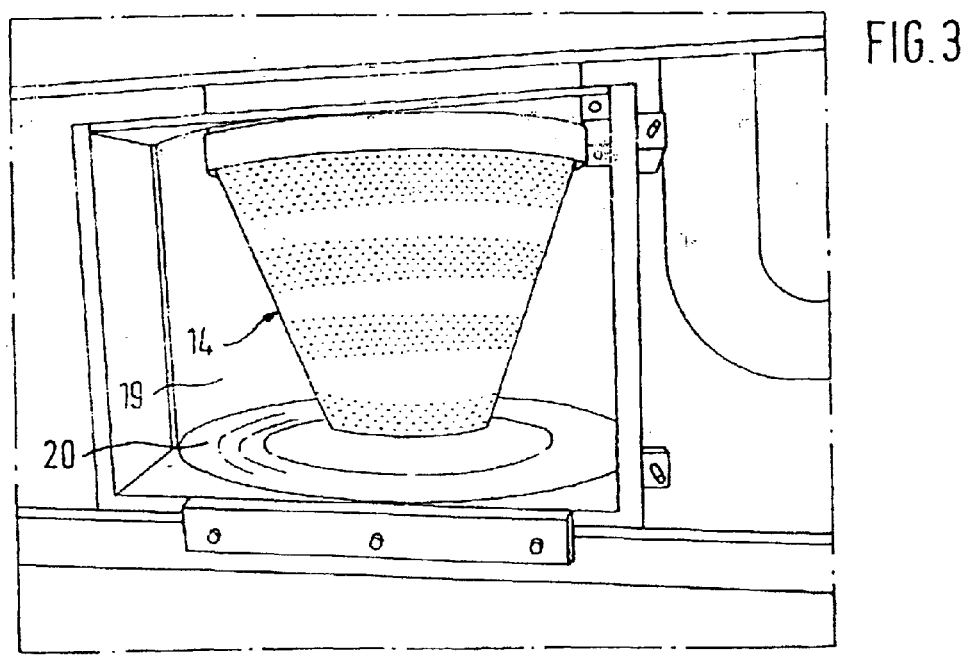
FIG. 3 shows the view of FIG. 2 with the side wall removed and with the collecting funnel visible in its mounted position.

FIG. 3 shows the collecting funnel 14 upon removal of the side wall 22, and the external collection area 19, as well as the bottom pan 20.

Figure 4:
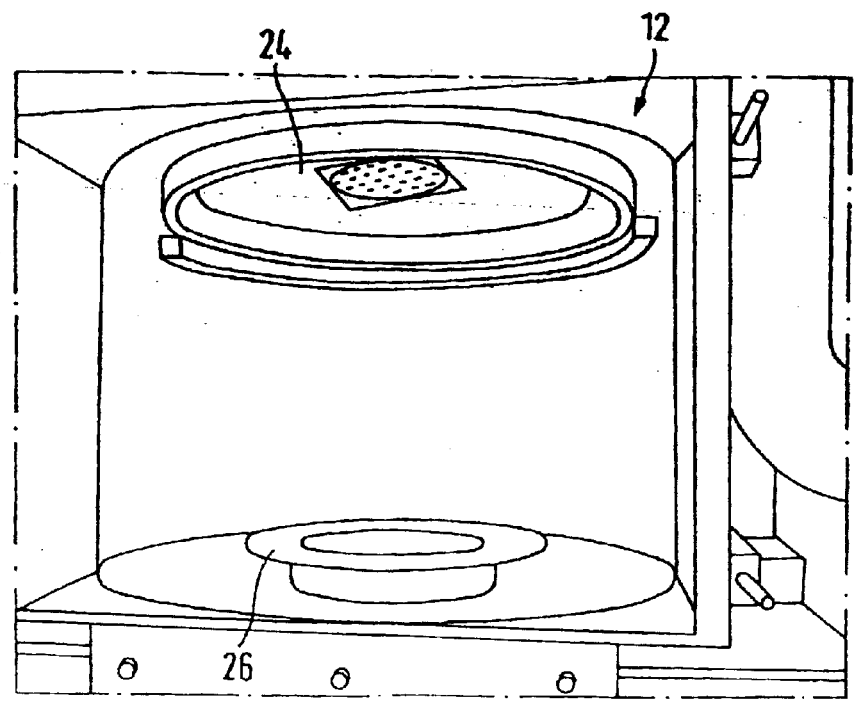
FIG. 4 shows a view of the housing of the discharge device with the collecting funnel removed.

FIG. 4 shows the discharge device 12 upon removal of the collecting funnel, and in particular it shows the upper fitting means 24 and the lower disk-shaped fitting means 26 for the collecting funnel.

Figure 5:
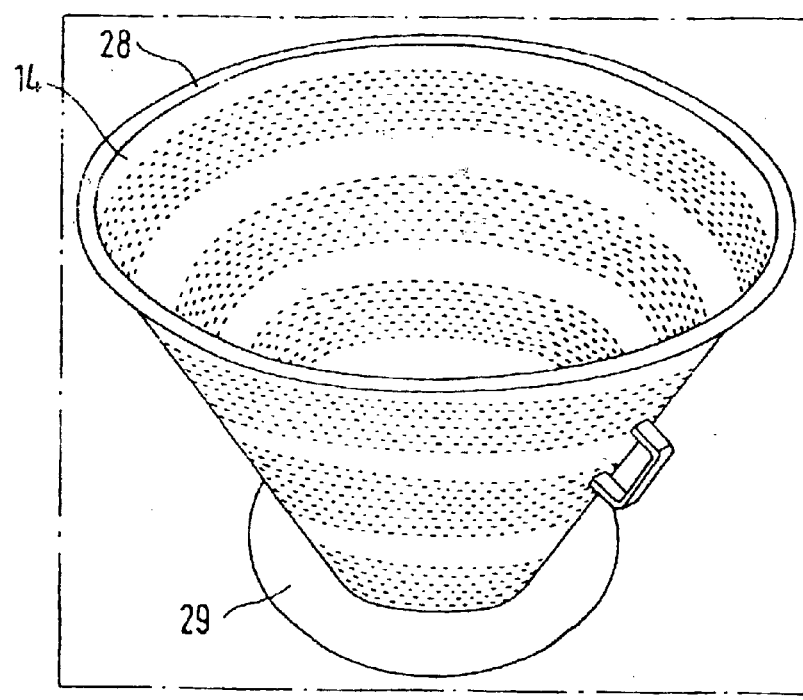
FIG. 5 shows a perspective view of the removed collecting funnel.

FIG. 5 shows the collecting funnel 14 with the upper fitting ring 28 and the lower disk-shaped fitting ring 29 for fitting the collecting funnel in the housing 18 of the discharge device 12.

Figure 6:
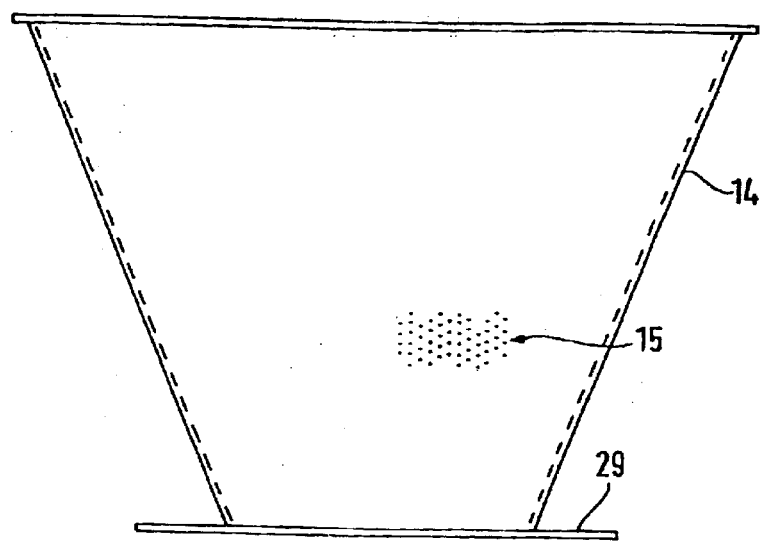
FIG. 6 shows a cross section through the collecting funnel.

FIG. 6 shows a cross section of the sieve-like collecting funnel 14 with sieve orifices 15 evenly distributed about the periphery, and the lower fitting ring 29.

Figure 7:
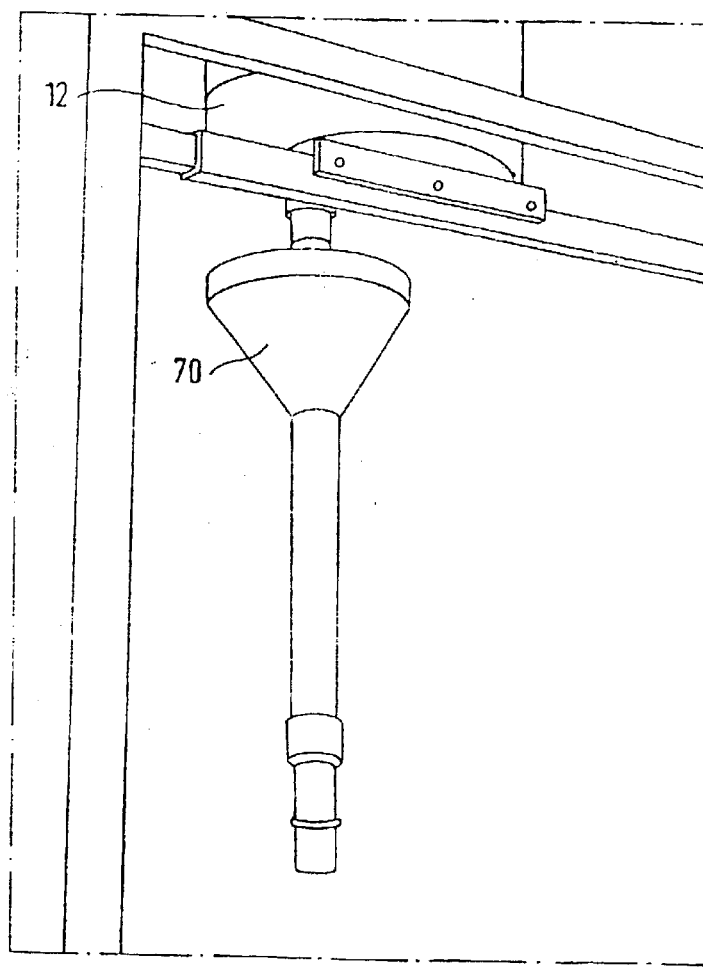
FIG. 7 shows a perspective view onto lower parts of the waste disposal plant, in particular the drainage of the extracted liquid.

FIG. 7 is a perspective view suggesting at the top the round housing of the discharge device 12, below which the laterally offset liquid drainage pipe 70 extends from the external region of the discharge device. This drainage pipe is likewise provided with a funnel; its remaining structure is described in somewhat greater detail in connection with FIG. 1.

Figure 8:
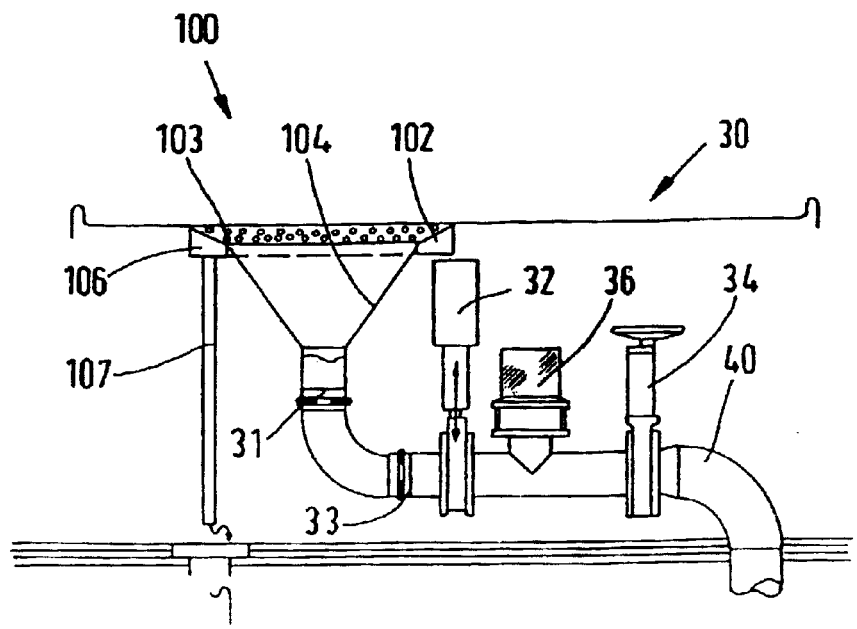
FIG. 8 shows an overall view of an input station with a specific input funnel.

FIG. 8 shows a decentralized input station 30 for supplying the wet garbage deposited there to the discharge device via closure devices 32, 34 to be cyclically opened, through the transport pipe 40 under partial vacuum (or compressed air). The number 36 indicates a connection by which partial vacuum or vacuum, or compressed air can be provided for transport purposes, for ventilation or for cleansing. Reference numbers 31 and 33 represent conventional pipe connectors.

The heart of the input station 30 comprises a collecting funnel 104 adjoining an external annular sieve 102 which is easily removable and rests on a peripheral drainage groove 106, which can be directly connected to a drain pipe of the room via a connecting pipe 107. The annular sieve has an angle of inward and downward inclination of 20° and the lower bordering input funnel has an angle of 45° from the horizontal.

Figure 9:
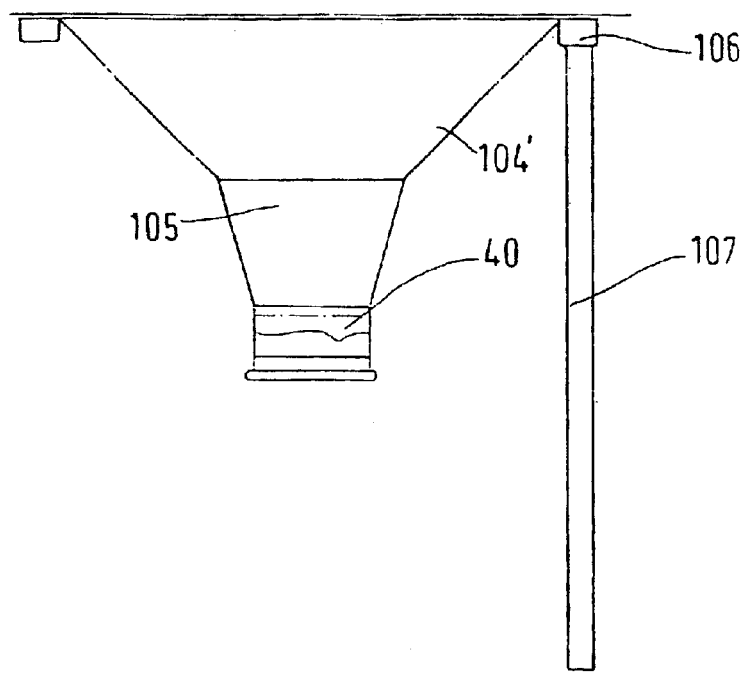
FIG. 9 shows a cross section through a differently designed input funnel of the input station.

FIG. 9 shows another input funnel of the input station, comprising an upper conical funnel portion 104 having an angle of 45°, and an adjoining lower funnel portion 105 with an angle of 75° from the horizontal and leading to the transport pipe 40.

Figure 10:
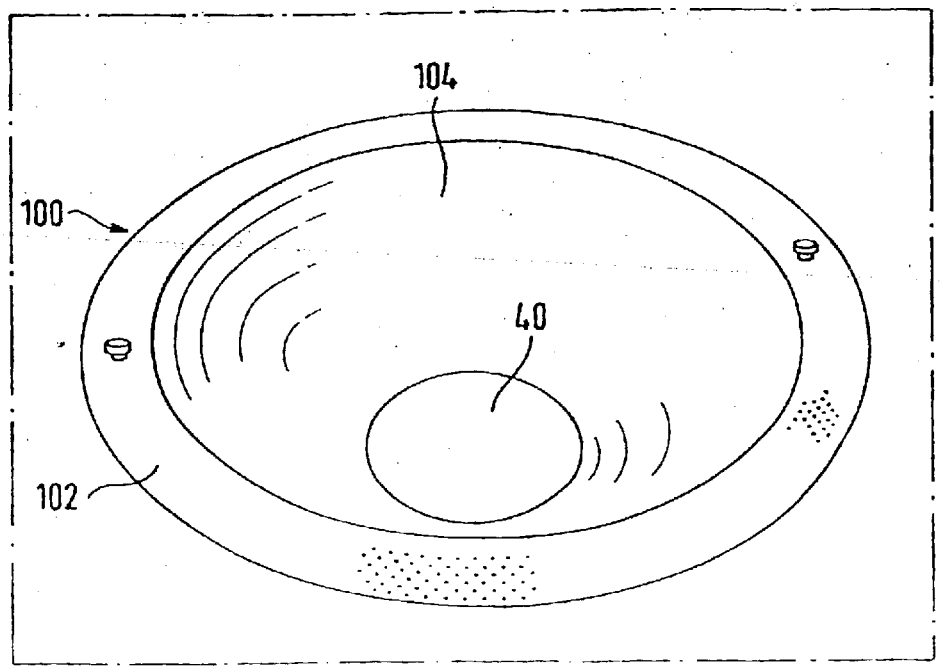
FIG. 10 shows a perspective plan view onto an input funnel with removable annular sieve.

FIG. 10 shows a perspective view of the input funnel 100 with an external flat annular sieve 102 and the steeper inwardly adjoining collecting funnel 104 leading to the transport pipe 40 or, if applicable, first of all to an additional funnel portion, intermediate pipe, various shut-off devices, etc.

Figure 11:
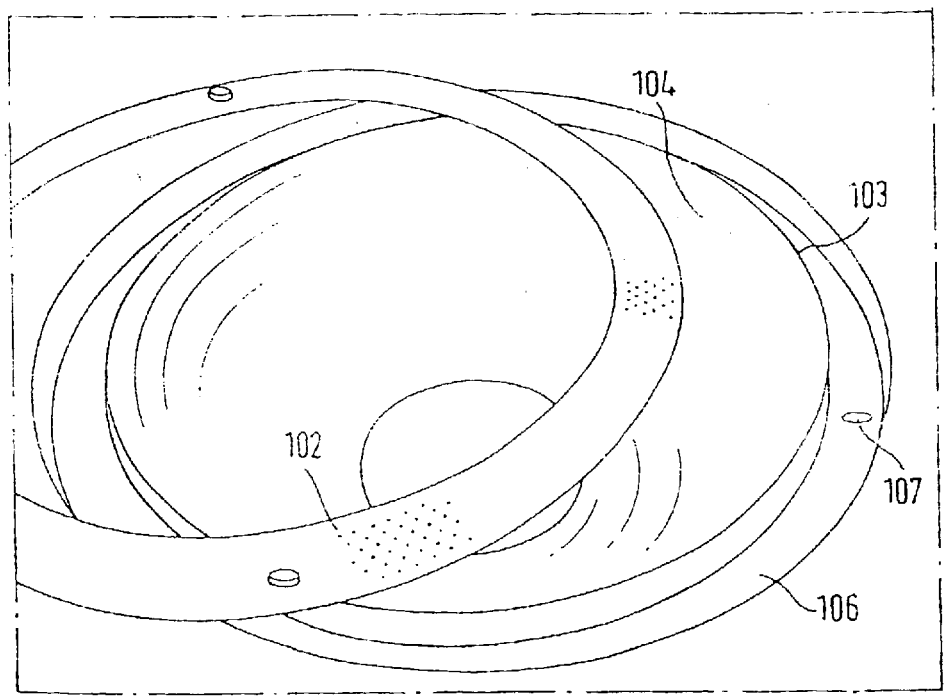
FIG. 11 shows the funnel of FIG. 10 with partly removed annular sieve and visible drainage groove with runoff outlet.

FIG. 11 shows the same as FIG. 10 but with the external annular sieve 102 removed and the peripheral drainage groove 106 beneath it being visible. A drainage means 107 is provided in the groove and is preferably directly connected to the drain pipe.

What is claimed is:

1. A waste disposal plant for wet garbage comprising a discharge device (12) and input stations (30) for the controlled supplying of wet garbage in batches to the discharge device via transport pipes (40), and further comprising a generator of conveying air in the form of compressed air or a partial vacuum (52) in communication with the discharge device (12) via a conveying-air conduit (50), and further comprising a liquid drainage line (60) and a collection device (70, 72) for the wet garbage for further processing, wherein the waste disposal plant further comprises:
    a) a sieve-like conical vertical collecting funnel (14) designed as a sieve and open at the bottom towards the collection device (70), and provided in a housing (18) of the discharge device (12), with the total wet garbage capable of being fed into the funnel from above, and
    b) an external collection area (19) for the liquid reaching the outside through the collecting funnel.

2. The waste disposal plant according to claim 1, further comprising an air compressor communicating with the individual input stations (30) for transferring the wet garbage in batches into an upper orifice of the collecting funnel of the discharge device (12), with one or more valves of the transport pipes (40) being opened only at this time.

3. The waste disposal plant according to claim 1, wherein the external collection area (19) for the liquid reaching the outside comprises the housing (18) of the discharge device and a lower collecting pan (20) to which the liquid drainage line (60) is connected.

4. The waste disposal plant according to claim 1, wherein the discharge device further comprises an easily opened sealing side wall (22) of the housing (20) for the easy installation and removal of the collecting funnel (14), one upper (24) and lower (26) fitting means each at the top and the bottom of the housing (18), respectively, for a precise fitting of the upper funnel edge (28) or of a lower sealing ring (29), respectively, of the collecting funnel (14).

5. The waste disposal plant according to claim 1, wherein the mounted collecting funnel (12) is secured by clamping means easily released manually without tools.

6. The waste disposal plant according to claim 1, wherein filters, exchangeable sieves, or disk filters are disposed in the collecting funnel.

7. The waste disposal plant according to claim 1, wherein the liquid collected in the external area (19) of the collecting funnel (14) drains off by gravity through the liquid drainage line (60) at controllable intervals via a sluice chamber (63) arranged between two control valves (64, 66).

8. The waste disposal plant according to claim 1, wherein the open bottom (16) of the collecting funnel (14) communicates with a waste disposal pipe (70) via a sluice chamber (72) formed between an upper controllable slide valve (74) and a lower controllable slide valve (76).

9. The waste disposal plant according to claim 8, wherein the sluice chamber (72) is connected to a grinder (80) of the largely pre-drained waste, the grinder (80) being connected to a residual water extraction press (90) that has a first outlet connected to a liquid drainage line (42) and a second outlet connected to a food refuse silo (24), whereby residual liquid extracted by the press (90) can be fed through the liquid drainage line (42) to a sewage system.

10. The waste disposal plant according to claim 1, wherein the input station (30) substantially comprises a conical input funnel (104; 104', 105) having an upper edge adjoining a flatter external annular sieve (102), and with the input funnel leading downward into the transport pipe (40).

11. The waste disposal plant according to claim 10, wherein the flatter external annular sieve (102) is held or rests in an easily removable manner on a peripheral groove (106) having a connecting line (107) to a drain pipe.

12. The waste disposal plant according to claim 11, wherein the opening angle of the flatter external annular sieve is horizontal or 15 to 25° from the horizontal, and the opening angle of the input funnel is 40 to 80° from the horizontal.

13. The waste disposal plant according to claim 12, wherein the input funnel comprises a flatter upper funnel portion (104') of approximately 40 to 50° and an adjoining lower funnel portion (105) of approximately 70 to 80° from the horizontal.

14. The waste disposal plant according to claim 11, wherein the opening angle of the flatter external annular sieve is 20° from the horizontal, and the opening angle of the input funnel is 40 to 50° from the horizontal.

* * * * *